(12) United States Patent
Wildeman et al.

(10) Patent No.: US 7,268,927 B2
(45) Date of Patent: *Sep. 11, 2007

(54) TUNABLE OPTICAL FILTER ARRAY AND METHOD OF USE

(75) Inventors: George F. Wildeman, Painted Post, NY (US); Michael J. Yadlowsky, Corning, NY (US)

(73) Assignee: Corning Incorporated, Corning, NY (US)

( * ) Notice: Subject to any disclaimer, the term of this patent is extended or adjusted under 35 U.S.C. 154(b) by 252 days.

This patent is subject to a terminal disclaimer.

(21) Appl. No.: 10/184,865

(22) Filed: Jun. 28, 2002

(65) Prior Publication Data

US 2003/0179788 A1    Sep. 25, 2003

Related U.S. Application Data

(63) Continuation-in-part of application No. 10/100,463, filed on Mar. 15, 2002, now abandoned.

(51) Int. Cl.
*G03H 1/02* (2006.01)
*G03H 1/04* (2006.01)

(52) U.S. Cl. .............................. 359/3; 385/147; 430/1

(58) Field of Classification Search .................. 385/37, 385/10, 15, 124, 24; 398/84, 85; 430/1, 430/2, 290; 65/3.11; 501/13, 54; 359/578, 359/579, 3

See application file for complete search history.

(56) References Cited

U.S. PATENT DOCUMENTS

| 4,373,782 A | 2/1983 | Thelen | |
|---|---|---|---|
| 4,514,053 A | 4/1985 | Borrelli et al. | 350/162.2 |
| 4,671,608 A | 6/1987 | Konishi | 350/3.7 |
| 5,287,427 A * | 2/1994 | Atkins et al. | 385/124 |
| 5,757,540 A | 5/1998 | Judkins et al. | 359/341 |

(Continued)

FOREIGN PATENT DOCUMENTS

EP    0887964    12/1998

(Continued)

OTHER PUBLICATIONS

S.S. Duncan, J.A. McQuoid and D.J. McCartney; "Holographic Filters in Dichromated Gelatin Position Tuned Over the Near-Infrared Region"; Optical Engineering 24(5), 781-785 (Sep./Oct. 1985).

*Primary Examiner*—Audrey Chang
(74) *Attorney, Agent, or Firm*—Timothy M. Schaeberle; Adenike Adebiyi

(57) ABSTRACT

According to an exemplary embodiment of the present invention, an optical apparatus includes an optical filter array which comprises a plurality of optical filter elements, wherein at least one of the optical filter elements is adapted for tuning to two or more wavelengths.

According to another exemplary embodiment of the present invention, an optical apparatus includes a monolithic optical filter array which further includes at least one tunable optical filter element. The optical apparatus also includes a tuning mechanism which tunes the tunable optical filter element to extract a signal of a particular wavelength from an optical signal which includes a plurality of wavelengths.

According to another exemplary embodiment of the present invention, a method for selectively extracting optical signals of particular wavelengths includes providing a monolithic optical filter array which further includes at least one tunable optical filter element. The method also includes tuning the tunable optical filter element to extract a signal of a particular wavelength from an optical signal which includes a plurality of wavelengths.

2 Claims, 10 Drawing Sheets

U.S. PATENT DOCUMENTS

| | | | | |
|---|---|---|---|---|
| 5,818,986 A * | 10/1998 | Asawa et al. | ......... | 385/24 |
| 6,023,545 A | 2/2000 | Eldada et al. | ......... | 385/37 |
| 6,212,312 B1 | 4/2001 | Grann et al. | | |
| 6,303,040 B1 * | 10/2001 | Oh et al. | ......... | 216/24 |
| 6,306,563 B1 | 10/2001 | Xu et al. | ......... | 430/321 |
| 6,389,199 B1 | 5/2002 | Eldada et al. | ......... | 385/37 |
| 6,510,264 B2 | 1/2003 | Bhagavatula et al. | ......... | 385/37 |
| 6,555,288 B1 | 4/2003 | Xu et al. | ......... | 430/270.1 |
| 6,602,000 B1 * | 8/2003 | Madsen | ......... | 398/84 |
| 6,650,810 B1 * | 11/2003 | Lieberman et al. | ......... | 385/37 |
| 6,673,497 B2 * | 1/2004 | Efimov et al. | ......... | 430/1 |
| 6,870,991 B2 * | 3/2005 | Ohta et al. | ......... | 385/50 |
| 6,912,073 B2 * | 6/2005 | Wildeman et al. | ......... | 359/3 |
| 2002/0033031 A1 | 3/2002 | Borrelli et al. | ......... | 65/404 |
| 2002/0045104 A1 | 4/2002 | Efimov et al. | ......... | 430/2 |
| 2002/0122647 A1 | 9/2002 | Blomquist et al. | ......... | 385/129 |
| 2002/0123419 A1 | 9/2002 | Borrelli et al. | ......... | 501/66 |
| 2003/0029203 A1 | 2/2003 | Borrelli et al. | ......... | 65/404 |
| 2003/0055120 A1 | 3/2003 | Blomquist | ......... | 522/1 |
| 2003/0174403 A1 | 9/2003 | Yadlowsky et al. | ......... | 359/578 |
| 2003/0174423 A1 | 9/2003 | Hart et al. | ......... | 359/889 |
| 2003/0174424 A1 | 9/2003 | Hart et al. | ......... | 359/889 |
| 2003/0175006 A1 | 9/2003 | Wildeman et al. | ......... | 385/147 |
| 2003/0175007 A1 * | 9/2003 | Wildeman et al. | ......... | 385/147 |
| 2003/0176629 A1 | 9/2003 | Blomquist et al. | ......... | 528/401 |

FOREIGN PATENT DOCUMENTS

| | | |
|---|---|---|
| JP | 09033750 | 2/1997 |
| WO | WO0157570 | 8/2001 |

* cited by examiner

TUNABLE OPTICAL FILTER ARRAY AND METHOD OF USE

CROSS-REFERENCE TO RELATED APPLICATIONS

The present application is a continuation-in-part of U.S. patent application Ser. No. 10/100,463, filed on Mar. 15, 2002 now abandoned, entitled "Tunable Optical Filter Array and Method of Use." The present application is related to U.S. patent application Ser. Nos. 10/186,068 and 10/186,121 entitled "Monolithic Filter Array" and "Optical Filter Array and Method of Use," respectively, and filed on even date herewith. The inventions described in these applications are assigned to the assignee of the present invention, and the disclosures of these applications are incorporated by references herein and for all purposes.

FIELD OF THE INVENTION

The present invention relates generally to optical communications, and particularly to a monolithic tunable optical filter array and its method of use.

BACKGROUND OF THE INVENTION

Optical transmission systems, including optical fiber communication systems, have become an attractive alternative for carrying voice and data at high speeds. In addition to the pressure to improve the performance of optical communication systems, there is also increasing pressure on each segment of the optical communication industry to reduce costs associated with building and maintaining an optical network.

One technology used in optical communication systems is wavelength division multiplexing (WDM). As is well known, WDM pertains to the transmission of multiple signals (in this case optical signals) at different wavelengths down a single waveguide, providing high-channel capacity. Typically, the optical waveguide is an optical fiber.

For purposes of illustration, according to one International Telecommunications Union (ITU) grid a wavelength band from 1530 nm to 1565 nm is divided up into a plurality of wavelength channels, each of which have a prescribed center wavelength and a prescribed channel bandwidth; and the spacing between the channels is prescribed by the ITU grid. For example, one ITU channel grid has a channel spacing requirement of 100 GHz (in this case the channel spacing is referred to as frequency spacing), which corresponds to channel center wavelength spacing of 0.8 μnm. With 100 GHz channels spacing, channel "n" would have a center frequency 100 GHz less than channel "n+1" (or channel n would have a center wavelength 0.8 nm greater than channel n+1). The chosen channel spacing may result in 40, 80, 100, or more wavelength channels across a particular passband.

In WDM systems it may be useful to employ tunable optical filters in this demultiplexing process. For example, tunable optical filters may be useful in reconfigurable optical networks to facilitate a number of operations including demultiplexing. Moreover, the drive to reduce network costs and operation costs has placed a value on flexibility that has not previously existed; and that may be provided by tunable optical filters.

Unfortunately known tunable optical filters suffer certain implementation and performance drawbacks (e.g., suitably sharp cutoff outside of the passband of the filter; suitably low polarization dependent loss; and suitably low chromatic dispersion, some or all of which tend to degrade over the tuning range of conventional tunable filters).

Because the known tunable optical filters have unacceptable drawbacks, there exists a need for optical filter elements which overcome at least the drawbacks described above.

SUMMARY OF THE INVENTION

According to an exemplary embodiment of the present invention, an optical apparatus includes an optical filter array which comprises a plurality of optical filter elements, wherein at least one of the optical filter elements is adapted for tuning to two or more wavelengths.

According to another exemplary embodiment of the present invention, an optical apparatus includes a monolithic optical filter array which further includes at least one tunable optical filter element. The optical apparatus also includes a tuning mechanism which tunes the tunable optical filter element to extract a signal of a particular wavelength from an optical signal which includes a plurality of wavelengths.

According to another exemplary embodiment of the present invention, a method for selectively extracting optical signals of particular wavelengths includes providing a monolithic optical filter array which further includes at least one tunable optical filter element. The method also includes tuning the tunable optical filter element to extract a signal of a particular wavelength from an optical signal which includes a plurality of wavelengths.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

FIG. 1(*b*) is a graph of the 2 dB center wavelength versus temperature for an optical filter element in array in accordance with an exemplary embodiment of the present invention.

DEFINED TERM

Figure 1:
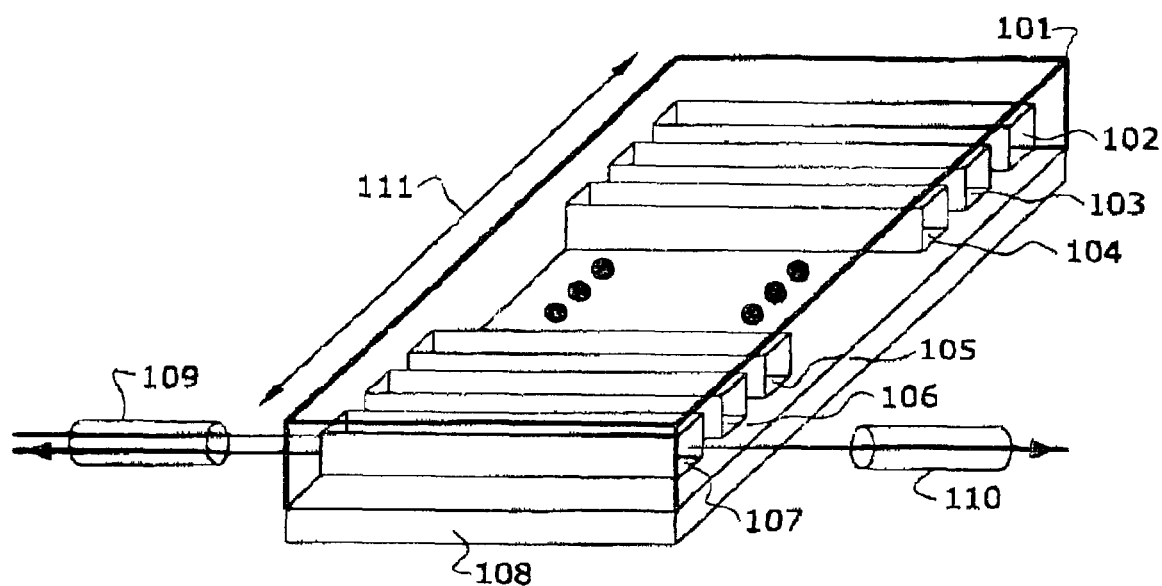
FIG. 1(*a*) is a perspective view of a thermally tuned optical filter array in accordance with an exemplary embodiment of the present invention.

As used herein the term "monolithic optical filter array" pertains to a plurality of optical filter elements formed in a common substrate.

DETAILED DESCRIPTION

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

Briefly, in accordance with exemplary embodiments of the present invention described herein, the present invention relates to optical apparatus comprising a monolithic structure which includes a plurality of tunable optical filter elements, an apparatus for extracting optical signals including the optical apparatus, and a method for extracting optical signals using the optical apparatus.

Advantageously, the optical filter array in accordance with exemplary embodiments described herein enables substantially continuous tuning over a wavelength range using coarse and fine tuning as is described in detail below.

Illustratively, the monolithic structure includes a plurality of optical filters, wherein at least one of the optical filters is adapted for tuning at two or more wavelengths. In its use as an apparatus for extracting optical filters, the optical filter array includes a tuning mechanism which selectively tunes at least one tunable optical filter enabling the separation of a particular wavelength channel from an optical signal that includes a plurality of wavelength channels. Moreover, a method of use of the apparatus enables selective extraction of a particular wavelength channel from an optical signal which includes a plurality of wavelength channels. Illustratively, the optical signal is a wavelength division multiplexed (WDM) or dense wavelength division multiplexed (DWDM) signal.

The present invention may be properly described through the use of illustrative embodiments described presently. It is noted that the illustrative embodiments, including the tuning mechanisms described, as well as the optical filter elements and the materials from which they are monolithically formed, are for purposes of illustration, and not limitation. These alternatives will be readily apparent to one having ordinary skill in the art having had the benefit of the present disclosure and are considered to be within the scope of the present invention as defined by the claims appended hereto.

For example, as will become more clear as the present invention proceeds, the optical filters in accordance with exemplary embodiments of the present invention may be reflective-type filters, transmissive-type filters or a combination of different reflection-type filters and/or transmissive-type filters.

It is noted that for purposes of facility of discussion, the disclosure of the present invention will focus on reflective-type filters, although it is to be understood that transmissive-type filters may be used as well. A salient feature of the optical filters in accordance with exemplary embodiments of the present invention is the capability of monolithic fabrication of tunable optical filter elements using various materials.

It is further noted (again for clarity of discussion) that the present disclosure focuses primarily on the use of optical filters of the present invention in multiplexing/demultiplexing applications in optical communication systems. However, the optical filters of the present invention have utility in a variety of other applications.

For example, the inventive optical apparatus also could be used in EDFA applications where the amplifier operates over a relatively wide bandwidth. For example, the tunable optical filters of an exemplary embodiment of the present may be used to reject ASE from EDFA's, particularly pre-amplified receivers.

Additionally, the inventive optical apparatus may be deployed to filter out ASE in a deployed laser. As is known, as the wavelength of a laser drifts over time and temperature, it is necessary to change the filter to match the wavelength of the laser. This synchronization is needed for long periods of time in deployed systems. In accordance with an exemplary embodiment of the present invention, laser drift may be accommodated for by coarse tuning to a particular optical filter element of the monolithic optical filter array, and be finely tuning the chosen optical filter element over a particular wavelength range that the laser may drift.

Alternatively the optical apparatus in accordance with an exemplary embodiment of the present invention could be a tueable dispersion compensator. To this end, at least one of the optical filter elements of the monolithic optical filter array would illustratively would be a chirped grating, such as a chirped Bragg grating. The grating could be linearly or non-linearly chirped, and could be finely tuned by techniques described herein. Moreover, a plurality of such gratings could be used in which coarse tuning and fine tuning could be carried out by techniques described herein.

It is further noted that the above examples of the utility of the monolithic optical filter arrays of the present invention are merely illustrative, and are intended to be in no way limiting of the present invention. Clearly, other implementations of the monolithic optical filter array will be readily apparent to one of ordinary skill in the art who has had the benefit of applicants' disclosure.

FIG. 1(a) shows an exemplary embodiment of the present invention in which a thermally tuned optical filter apparatus 100 includes a monolithic optical filter array 101 which further includes a plurality of optical filter elements. The monolithic optical filter array 101 comprises N optical filter elements (N=integer) 102, 103, 104, 105, 106, 107 for n-wavelength channels having center wavelengths $\lambda_1, \ldots, \lambda_n$. For purposes of illustration, n and N may be 40, 80, 100, 200 or 400. Of course, this is merely illustrative and intended to be in no way limiting of the present invention.

Illustratively, the N optical filter elements 102-107 are reflective filter elements. For example, the optical filter elements 102 may be Bragg gratings such as those described in detail in U.S. patent application Ser. No. 09/874,721, entitled "Bulk Internal Bragg Gratings and Optical Devices," to Bhagavatula, et al., and filed on Jun. 5, 2001. Moreover, the substrate 103 in which the optical filter elements arc monolithically formed may be a glass material such as those taught in U.S. patent application Ser. No. 09/874,352, entitled "UV Photosensitive Melted Germano-Silicate Glass," to Borrelli, et al., and filed on Jun. 5, 2001; or may be one of the glass material as taught in U.S. patent application Ser. No. 10/186,123 and entitled "Photosensitive UV Glasses" to Nicholas Borrelli, et al., filed on even date herewith. The inventions described in these referenced U.S. patent applications are assigned to the Assignee of the present invention, and the disclosures of these applications are specifically incorporated by reference herein and for all purposes.

In one exemplary embodiment of the present invention, the substrate is formed from a meltable glass having a molecular hydrogen content of $\geq 10^{17}$ $H_2$ molecules/cm$^3$. This meltable glass may be, for example, a germanosilicate glass. In another exemplary embodiment of the invention, the substrate is formed from a meltable photosensitive germanosilicate glass material having a hydrogen content less than approximately $10^{17}$ $H_2$ molecules/cm$^3$. In one embodiment of the invention, the substrate is formed from a glass material having a composition including approximately 40 mole % to approximately 80 mole % $SiO_2$, approximately 2 mole % to approximately 15 mole % $GeO_2$, approximately 10 mole % to approximately 36 mole % $B_2O_3$, approximately 1 mole % to approximately 6 mole % $Al_2O_3$, and approximately 2 mole % to approximately 10 mole % $R_2O$ wherein R is an alkali. In another embodiment of the invention, the substrate is formed from a glass material having a composition including approximately 25 weight % to approximately 45 weight % $SiO_2$, approximately 3 weight % to approximately 22 weight % $GeO_2$, approximately 7 weight % to approximately 28 weight % $B_2O_3$, approximately 6 weight % to approximately 22 weight % $Al_2O_3$, approximately 6 weight % to approximately 25 weight % $R_2O$ wherein R is an alkali, and approximately 3-11 weight % F.

It is noted that there are advantageous characteristics of the glass monolithic optical filter elements 102-107 in accordance with the presently described exemplary embodiments that are described in the above referenced application entitled "Optical Filter Array and Method of Use." Further details of such advantageous characteristics are found therein.

The monolithic structure of the present invention may be formed from a variety of materials. As described above, the monolithic structure may be formed in a substrate of the glass materials taught in the above-referenced Borrelli et al. applications. Alternatively, other photosensitive glass materials may be used as the substrate material. For example, suitable materials include glasses that achieve an index change by thermally induced growth of crystals on light-induced nucleation centers, such as those described in U.S. Pat. No. 4,514,053, and the photo-thermo-refractive glasses described in U.S. Patent Application Publication No. US 2002/0045104. Other desirable photosensitive glasses include doped porous glasses which are consolidated at a relatively high temperature. While the preferred embodiments given below are described with reference to a glass monolithic structure, the skilled artisan will recognize that the monolithic structure may be formed from other photosensitive materials.

It is further noted that the above referenced gratings and materials are intended to be illustrative of and in no way limiting of the scope of the present invention. In an exemplary embodiment of the present invention, photosensitive organic materials are used as the substrate in which optical filter elements may be formed. For example, materials such as dichromated gelatin and photosensitive polymeric materials may be used to form the monolithic structures of the present invention. Fluorinated polymeric materials are especially suitable for use in the present invention. Polymer-dispersed liquid crystal materials may also be suitable for use as the substrate in the present invention. According to one embodiment of the present invention, the monolithic structures of the present invention may be formed in polymeric materials having a shortest dimension of greater than about 100 μm, illustratively greater than about 400 μm.

Especially suitable polymers for use in the present invention are described, for example, in U.S. patent application Ser. Nos. 09/745,076, 09/747,068, 09/912,827, and 10/067,669, which are incorporated herein by reference. Especially desirable polymeric materials for use in the present invention are cured products of energy curable compositions including two monomers having differing refractive index and rates of diffusion. One exemplary fluoropolymer material is the cured product of an energy curable composition including about 50 wt % 2,2,3,3,4,4,5,5-octafluorohexanediol diacrylate (UV-8), and about 50 wt % of the tetraacrylate of FLUOROLINK T, a tetrafunctional perfluoropolyether alcohol available from Ausimont USA. The tetraacrylate, known herein as UV-T, has the structure

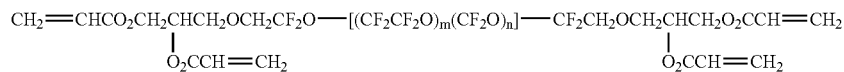

The energy curable composition also includes about 1 wt % photoinitiator.

In an exemplary embodiment of the invention, the monolithic filter elements of the present invention is fabricated by casting the energy curable composition described above into a mold having the desired dimensions. For example, the mold may have a parallelepiped shape with no interior dimension shorter than 100 μm. A grating is formed in the monolithic element using the method described in U.S. Pat. No. 6,023,545, which is incorporated herein by reference. The energy curable composition is partially cured by brief (e.g. a few seconds) exposure to a suitable UV light source. The partially cured polymer is irradiated through a phase mask with UV radiation from an argon ion laser, forming the grating. The element is then exposed again to a suitable UV light source to fully cure the polymer, and the cured monolithic element is removed from the mold.

In accordance with the exemplary embodiment shown in FIG. 1(*a*), a thermal element 108 is disposed proximate to filter elements 102-107. Thermal element 108 is illustratively a thermoelectric cooler (TEC), such as Peltier effect thermoelectric cooler, and is used to modulate the temperature of the optical filter elements 102-107 in a manner described herein. Of course, the selection of a TEC for the thermal element 108 is merely illustrative, and other thermal elements could be used to effect thermal tuning of the optical filter elements while keeping within the purview of the present invention. For example, thin-film heating elements may be used in this capacity.

It is further noted that in the exemplary embodiment shown in FIG. 1(*a*), all filter elements are tuned using a single thermal element 108 disposed beneath the monolithic optical filter array 101. This is also merely illustrative. To wit, the thermal element 108 could comprise a plurality of individual elements, each of which thermally tunes a certain number (i.e. two or more) of the optical filter element 102-107. Moreover, the thermal element, or a plurality of thermal elements as referenced immediately above, could be disposed over the top surface of the monolithic optical array. This placement of such a thermal element(s) could be instead of or in addition to thermal element 108 shown disposed beneath the monolithic optical filter array 101 in FIG. 1(a). Finally, it is noted that it is possible to have individual thermal elements for each optical filter element.

In operation, an optical signal from an input/output collimator 109 is incident upon a selected one of the filter elements 107. The input optical signal from input collimator 107 includes a plurality of optical channels. For example, the input optical signal could be a WDM or a DWDM optical signal having channels 1, . . . , n, which have respective center wavelengths $\lambda_1, \ldots, \lambda_n$. In the exemplary embodiment shown in FIG. 1(a) wherein the filter elements 102-107 are illustratively reflective filter elements, a selected one of said channels is reflected by the selected optical filter element 107 and is incident upon input/output collimator 109. The remaining optical channels are transmitted through the chosen filter element, and are incident upon an output collimator 110. It is noted that a variety of input/output devices may be used for input/output collimator 109 and output collimator 110. Moreover, certain techniques may be used to reduce specular reflection. Further details of these input/output devices as well as techniques to reduce specular reflections may be found in the above referenced application entitled "Optical Filter Array and Method of Use." It is further noted that these referenced input/output devices and techniques may be used in conjunction with other exemplary embodiments described herein.

As will become more clear as the present description proceeds, each of the filter elements 102-107 is designed for thermal tuning over two or more wavelength channels. As such two or more wavelength channels may be reflected by the particular optical filter element chosen depending upon the shifting of the effective optical periodicity by thermal effects of the thermal element 108. To wit, the thermal variance may change the refractive index and/or the physical periodicity of the Bragg grating of the optical filter element, thereby changing its resonant wavelength. It is noted that the thermal tuning results in the fine tuning of the optical apparatus 100.

Coarse tuning is effected by the one-dimensional motion 111 and alignment of the input/output collimator 109 and the output collimator 110 to a particular optical filter element. Consequently, the coarse tuning of the optical apparatus involves the selection of a particular optical filter element which will reflect a particular number of channels. Reflection of the desired one particular wavelength channel (i.e., fine tuning) entails the thermal tuning described above.

To effect the motion of the input/output collimator 109 and the output collimator 110, an electronically controlled mechanical device such as a stepper motor could be used. Further details of such a device may be found in the above referenced application entitled "Optical Filter Array and Method of Use."

The control of the motion of the input/output collimator and output collimator is illustratively carried out as follows. A microcontroller (not shown) may access a look-up table which contains the reflection wavelength band of each of the individual filter elements over a particular temperature range. A translation stage illustratively moves either the input/output collimator 109 and output collimator, or the monolithic optical filter array 101 in one direction 111 so that selected one of filter elements 102-107 is properly aligned with the input/output collimator 109. Thereafter thermal tuning may be effected to fine tune the optical filter element to reflect a desired frequency/wavelength channel.

In accordance with the exemplary embodiment of FIG. 1(a), coarse (mechanical) and fine (thermal) tuning are carried out enabling wavelength channel selection over a prescribed passband in a manner which affords significant advantage over conventional methods/apparati.

For example, the illustrative embodiment enables adjustment of the wavelength of each filter element to accommodate for manufacturing induced variations in the center wavelength of a wavelength channel. Moreover, the present invention as described with the illustrative embodiments enables continuous or nearly continuous tuning over a relatively wide range (e.g. 30 nm-80 nm).

Furthermore, because each individual filter requires a relatively small amount of tuning, tight control is not necessary to ensure that the filter device is at a target wavelength within a prescribed absolute tolerance. Hence, the control system can be simplified. Typically, the application of the filter device dictates the accuracy with which the filter must be set (e.g., WDM systems illustratively require 5 GHz of filter de-tuning). The broader the range over which the filter device must operate, the more difficult it becomes to maintain particular absolute accuracy.

By virtue of the present invention the tuning range illustratively may be may be reduced from approximately 40 nm for a conventional single tunable filter to approximately 0.4 nm to approximately 1.2 nm for the optical filter elements (e.g., filter elements 102-107) of the present invention. To this end, 0.4 nm is the approximate range for a 50 GHz system (i.e., 0.4 nm at 1550 nm) if a tuneable optical filter elements are targeted to be nominally between the 50 GHz channels. Then the adjacent channels are spaced approximately 25 GHz apart for a total of approximately 50 GHz or 0.4 nm.

Of course, the 0.4 nm tuning range pertains to two channels in the present illustrative embodiment. Three channels could be reached by targeting a particular tuneable optical filter element for a specific channel and tuning up or down 50 GHz (i.e. over 100 GHz), requiring a tuning range of 0.8 nm. To go to four channel tuning per tuneable optical filter element, it is necessary to tune 25 GHz to the adjacent channel plus 50 GHz to the next channel for a total of 75 GHz in each direction. The total range of 150 GHz requires a tuning range of 1.2 nm.

Figure 1B:
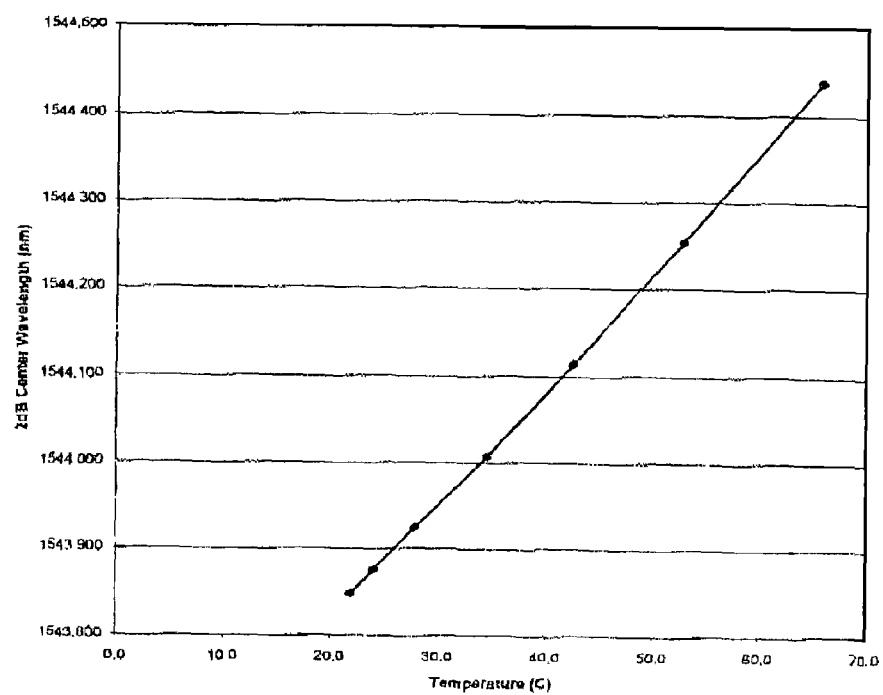

Turning to FIG. 1(b), a graph of an illustrative fine tuning range for an illustrative optical filter element of an embodiment of the present invention using thermal tuning is shown. To this end, the 2 dB center wavelength versus temperature for an optical filter element of a monolithic optical filter array formed in a glass substrate according to an exemplary embodiment is shown. The temperature tuning in the present example is 0.013 nm per ° C. For 0.4 nm tuning a temperature change of approximately 31° C. is needed; for the illustrative optical filter element to be tuneable over three channels would require a temperature change of 62° C.; and tuning over four channels would require a temperature change of 93° C.

It is noted that the above described data shown in FIG. 1(b) is illustrative, and other glass materials may exhibit different tuning characteristics over temperature. Moreover, it is noted that materials other than glass may have different tuning characteristics. For example, polymer materials generally exhibit a greater temperature sensitivity (for example, on the order of 0.3 nm/° C.); thus, a smaller temperature variation will result in a greater wavelength/frequency change compared to the glass material referenced in connection with FIG. 1(b).

Beneficially the above described illustrative tuning range of the tunable optical filter elements of an exemplary embodiment of the present invention results in a significant reduction of the required accuracy of the control system.

Moreover, the fine tuning may be used to reduce the center wavelength tolerance of the optical filter elements. A temperature offset could be stored in the controller, and used to correct the nominal temperature to which the filter element is set for a particular target wavelength.

Finally, as previously discussed, coarse tuning is effected by the motion of the input/output collimator 109 relative to the monolithic optical filter array. This may be achieved by methods described above. The individual optical filter elements 102-107 are approximately 0.1 mm to approximately 1.0 mm in cross-section for typical WDM applications. The alignment tolerances for the optical apparatus should be roughly 10 times finer than this. This degree of tolerance is well within the capabilities of stepper motors, DC motors and linear solenoids discussed in the referenced application.

Figure 2:
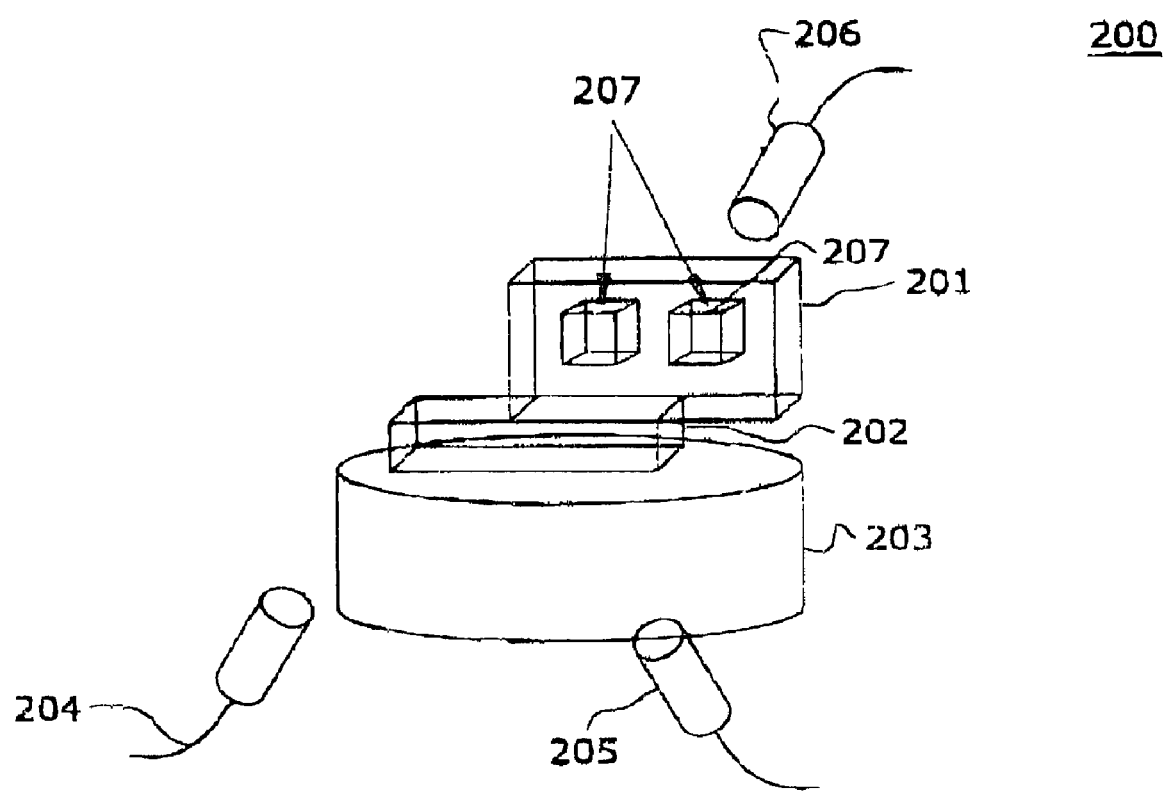
FIG. 2 is a perspective view of an angle-tuned filter array in accordance with an exemplary embodiment of the present invention.

FIG. 2 shows an angle tuned filter apparatus 200 according to an exemplary embodiment of the present invention. A filter element array 201 is disposed in close proximity to a filter selector 202. A rotation stage 203 is selectively rotated by a rotation mechanism (not shown) to orient the angle of incidence of light from an input collimator 204 upon the frequency selector 202, and therefore to a particular filter element 207 in the optical filter array 201. The optical signal from the input collimator 204 includes a plurality of wavelengths. Illustratively, the optical signal is a WDM or DWDM optical signal which may have 40, 80, 100 (or more) wavelength channels, with each wavelength channel having a center wavelength. In this illustrative embodiment, one of the center wavelengths is reflected from the selected filter element and is incident upon a first output collimator 205. All remaining wavelengths are transmitted through the filter element 207, and are incident upon an output collimator 206. These transmitted signals may be further demultiplexed by a similar technique, and using a cascaded apparatus which is similar to the angled tuned filter apparatus of the illustrative embodiment shown in FIG. 2.

The optical filter array 201 in accordance with an exemplary embodiment shown in FIG. 2 illustratively includes two optical filter elements 207. Each filter element 207 is designed to be tunable over a defined portion of the frequency/wavelength band of the input optical signal from input collimator 204. Moreover, it is noted that the use of two filter elements 207 in the optical filter array 201 is merely illustrative, and is no way limiting of the invention. To this end, depending upon the application, as well as the tunability of the filter elements, more than two filter elements could be used to form the filter array. It is further noted that the array could have a series of rows and columns, and that a plurality of individual substrates could be stacked or sequentially arranged.

The use of individual substrates usefully relieves manufacturing yields since the failure of an optical filter element wastes fewer collocated filter elements. Further details of the fabrication of a monolithic optical filter array having rows and columns of filter elements; and of the arrangement of a plurality of individual optical filter arrays in a stacked arrangement are described in the above referenced application, entitled "Optical Filter Array and Method of Use."

It is noted that angled tuned filter apparatus 200 of the exemplary embodiment shown in FIG. 2 has a coarse tuning capability and a fine tuning capability. To this end, coarse tuning refers to the alignment of the input collimator 204 to one of the filter elements 207. This coarse tuning enables the selection of one of the optical filter elements 207 from the plurality thereof, which may be tuned to reflect more than one wavelength channel. Fine tuning is illustratively carried out by rotation of the rotation stage so that light from the input collimator 204 is oriented at a particular angle of incidence relative to the chosen filter element 207. By choosing the suitable angle of incidence, the reflection of the particular desired wavelength channel is effected.

In operation, a microcontroller (not shown) may be used to control the rotation of the rotation stage 203. Specifically, the microcontroller may access a look-up table which stores coarse tuning and fine tuning information. To this end, the look-up table could store specific rotational positions of the rotation stage 203 for each optical filter element 207 and the corresponding wavelength channels the filters element 207 will reflect at particular angles of incidence of the input collimator 204.

For purposes of illustration, if the input signal from input collimator 204 includes wavelength channels 1, . . . , 5 with corresponding wavelengths $\lambda_1$-$\lambda_5$, and it is desired to reflect wavelength channel 3 having center wavelength $\lambda_3$ to the first output collimator 205, the microcontroller can look up the desired rotational position of the rotation stage 203 relative to one of the two filter elements 207 and command the rotation stage 203 to move to that position. Extraction of any other wavelength channel having a particular center wavelength could be similarly effected. Finally, it is noted that precise rotation of the rotation stage to effect orientation of the input collimator 204 and filter selector relative to a particular filter element 207 of the optical filter array 201 may be carried out using a stepper-motor, DC motor or similar device. Moreover an encoder may be used to provide feedback.

Figure 3:
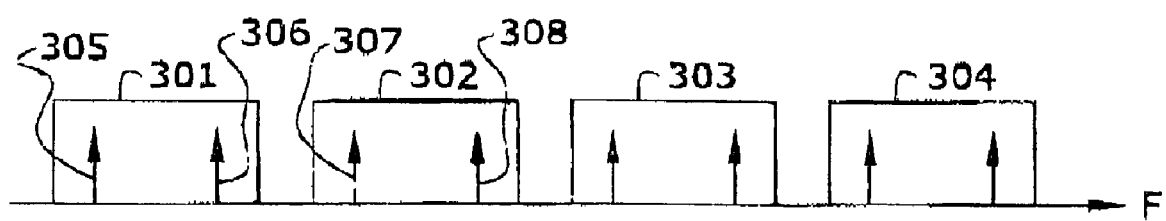
FIG. 3 is a representative view of WDM signals over a tuning range incorporating a plurality of tunable filter elements in accordance with an exemplary embodiment of the present invention.

Turning to FIG. 3, a representative view of the frequency (F) for four filter elements 301, 302, 303 and 304. Illustratively, these filter elements are identical to those described in connection with the exemplary embodiment of FIG. 2. In this rather straight forward but illustrative example of the present invention, the thermal tuning range of each element 301-304 may be engineered to be slightly greater than one full channel spacing. To wit, the first filter element 301 may be designed to reflect a first wavelength channel having a frequency 305 and a second wavelength channel having a frequency 306. Likewise, the second filter element 302 would reflect a third frequency 307 and a fourth frequency 308. By design, the first frequency 305 could be chosen to correspond to a center wavelength of a first channel, while the second frequency 306 could be chosen to correspond to a center wavelength of a second wavelength channel. Likewise, third frequency 307 and fourth frequency 308 would correspond to third and fourth wavelength channels of the optical signal. Similarly, the frequencies of third filter 303 and fourth filter 304 would correspond to other wavelength channels.

As can be readily appreciated, by virtue of the thermally tuned filter elements in accordance with the present exemplary embodiment of the invention, the number of filter elements needed would be approximately one-half of the total number of channels. In conventional thermally tuned filters, the filters are engineered so that the full temperature tuning range is equal to the full desired tuning range. As practical temperature ranges are within approximately 50° C. to approximately 100° C., this requires a large change in filter center wavelength per degree Celsius. This in turn requires exceedingly great temperature stability and resolution.

However, in accordance with the present exemplary embodiment of the invention, with the tuning range being equal to only one channel spacing, the required resolution to tune the filter is greatly relaxed. The filter also becomes less sensitive to thermal transients and manufacturing variations. Finally, it is noted that a representative diagram of the frequency selectivity of the tunable optical filters which are shown in FIG. 3 and described in connection with thermal tuning may also be readily be ascertained for the angle tuned filter apparatus 100 of the exemplary embodiment of FIG. 1(a). Again, advantageously, the angle tuning enables the reduction in the number of filters required to accommodate extraction of frequency/wavelength across a particular range by having tunable optical filters which can be tuned to reflect more than one frequency.

Figure 4:
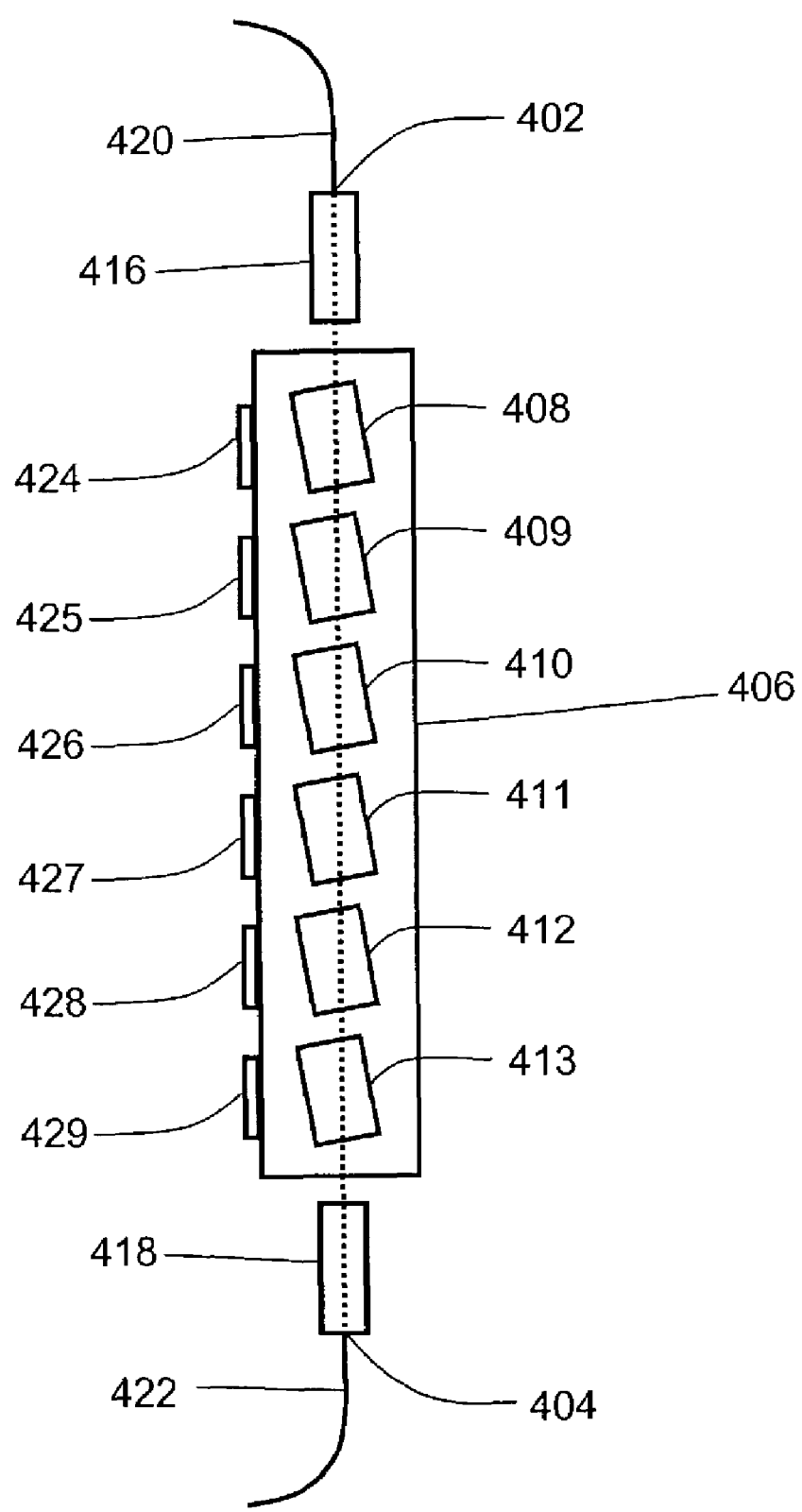
FIG. 4 is a schematic view of a of a thermally tuned optical filter array operative as a wavelength blocker in accordance with an exemplary embodiment of the present invention.

Another exemplary embodiment of the present invention is shown in FIG. 4. In this embodiment of the invention, the device includes an input port 402, and an output port 404. Input port 402 and output port 404 define an optical path 405. The device further includes a monolithic filter array 406. The filter elements 408-413 of the filter array 406 are disposed in series along the optical path. In this device, a multiplexed optical signal may encounter each filter element in sequence while propagating from the input port to the output port. Illustratively, at least one of the optical filter elements is adapted to be selectively tunable independent from the remaining optical filter elements. For example, each of the optical filter elements may be adapted to be selectively tunable independent from the remaining optical filter elements. As used herein, an optical filter element is selectively tunable independent from the remaining optical filter elements if the optical filter element can be tuned without affecting the tuning of any other filter element. Illustratively, at least one of the filter elements of the monolithic filter array is coupled to a unique tuning device. For example, each of the filter elements may be coupled to a unique tuning device. As used herein, a unique tuning device is configured to substantially tune one and only one filter element. A single substrate having a M×N array of filter elements may be used to fabricate, for example, M devices, each having a separate input port and output port with N filter elements therebetween.

In the embodiment of the invention of FIG. 4, the device is configured as a wavelength blocker. The input port of this device is at the input end of input collimator 416, while the output port of the device is at the output end of output collimator 418. Input and output optical fibers (420 and 422) are coupled to the input and output ports. In this exemplary device, the filter elements are formed to be slightly detuned from the center wavelengths of the wavelength channels of the optical signal. For example, for a 50 GHz channel spacing, the filter elements may be detuned to be about 25 GHz more or less than the center wavelengths of the wavelength channels. Alternatively, the filter elements may be detuned to be entirely out of the wavelength band of interest. Each filter element is coupled to a unique tuning device 424-429. As described above, the tuning devices may be, for example, thermoelectric coolers or thin film heaters. The filter elements are aligned to reflect optical signals out of the optical path. In use, one or more of the filter elements may be tuned to the wavelength of a wavelength channel, reflecting that wavelength out of the optical path, thereby "blocking" that wavelength. Any non-blocked wavelengths continue along the optical path and are coupled through the output port into the output optical fiber. As the skilled artisan will appreciate, a similar device may be constructed in which the filter elements are formed to be resonant with the wavelengths of the wavelength channels, and tuned to become non-blocking.

Figure 5:
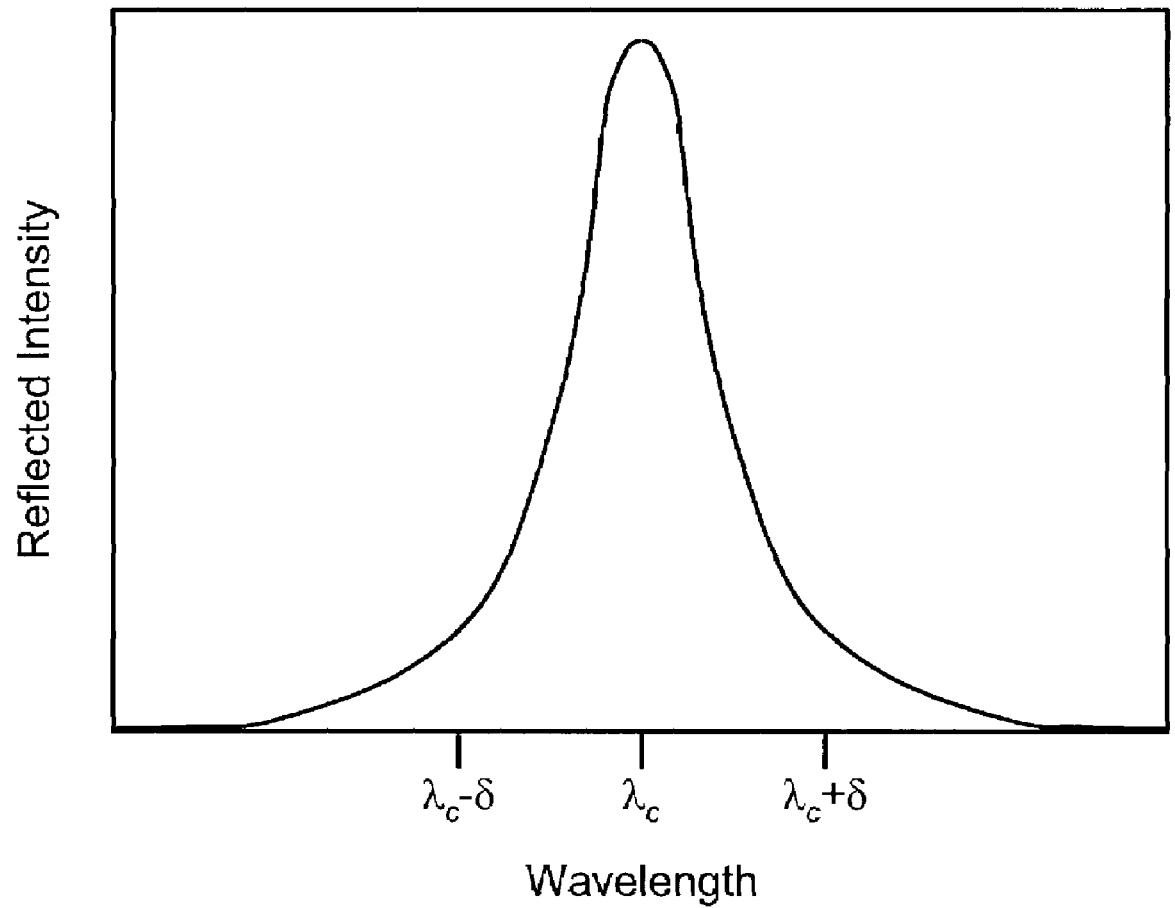
FIG. 5 is a schematic graph of reflected intensity versus wavelength for a generalized optical filter.

By tuning the filter elements to be only partially blocking, the wavelength blocker configuration described in connection with FIG. 4 may also be used to perform dynamic spectral equalization. In this embodiment of the invention, at least one of the filter elements is adapted to be selectively tunable to variably reflect a wavelength channel. As the skilled artisan will recognize, most filters have a filter function similar to that shown in FIG. 5. The exemplary reflective filter of FIG. 5 has a center wavelength of $\lambda_c$, but is somewhat reflective over a range of wavelengths $\lambda_c-\delta$ to $\lambda_c+\delta$. The filter has its highest reflectivity at $\lambda_c$, and becomes gradually less reflective as the wavelength moves away from $\lambda_c$. When used as a dynamic spectral equalizer, each filter element may be fabricated to be essentially non-reflective for a given wavelength channel. In use, each filter may be tuned so that it is variably reflective for its wavelength channel. For example, an optical signal may have a first wavelength channel that is 3 dB weaker than a second wavelength channel. A first filter may be tuned to allow a first wavelength channel to pass through substantially unreflected, while a second filter may be tuned to provide about 3 dB of reflection to the second wavelength channel, thereby equalizing the intensities of the two channels. In this embodiment of the invention, the filters may be designed by the skilled artisan to have a relatively wide range of tunability.

Figure 6:
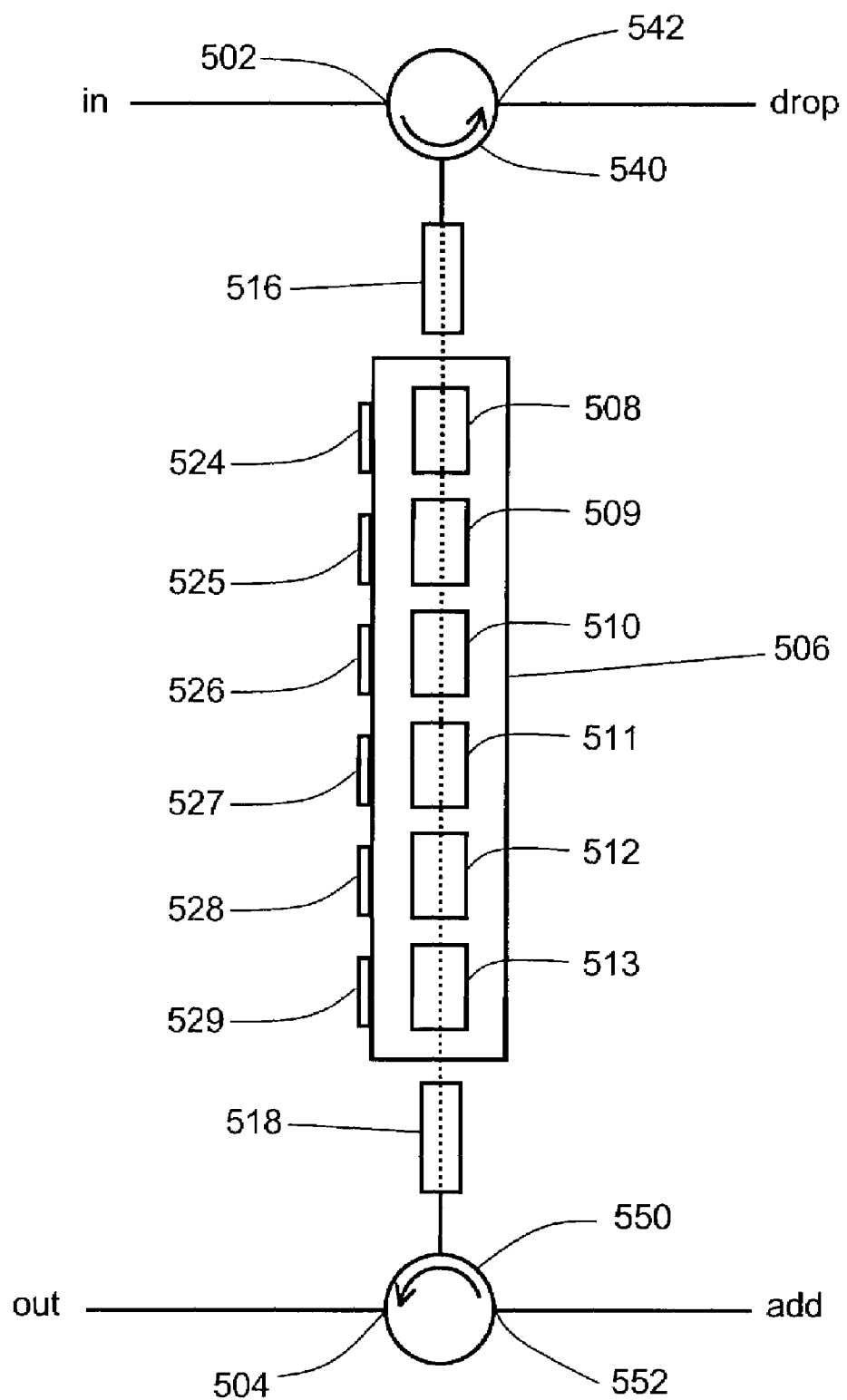
FIG. 6 is a schematic view of a of a thermally tuned optical filter array operative as a wavelength add-drop multiplexer in accordance with an exemplary embodiment of the present invention.

In another embodiment of the present invention, shown in FIG. 6, the device may be configured as a reconfigurable add-drop multiplexer. The device of FIG. 6 is similar to the device of FIG. 4, including a monolithic filter array 606 disposed between an input port 602 and an output port 604. The monolithic filter array includes a plurality of filter elements 608-613, each coupled to a unique tuning device 624-629. In the embodiment of FIG. 6, the filter elements are aligned so that they reflect optical signals along the optical path. In this embodiment of the invention, the input port is one port of an input circulator 640, and the output port is one port of an output circulator 650. An optical signal entering input port 602 is coupled through circulator 640 to the input collimator 616, and encounters filter elements 608-613 en route to the output collimator 618. Light exiting the output collimator is coupled through circulator 650 to the output port 604. As described above in connection with FIG. 4, the filter elements may be detuned (e.g. by ±25 GHz) from the center wavelengths of the wavelength channels. In use, one or more of filter elements may be tuned to the wavelength of a wavelength channel, reflecting that wavelength back along the optical path, through input collimator 616, through circulator 640 and out of drop port 642, thereby dropping that wavelength. Any wavelength channels to be added enter the device at add port 652 of output circulator 650, are coupled through the output collimator to filter array, and are reflected along the optical path by an appropriately tuned filter element. Any non-dropped wavelengths and any added wavelengths are coupled through the output collimator 618, through circulator 650, and exit the device at the output port 604.

Figure 7:
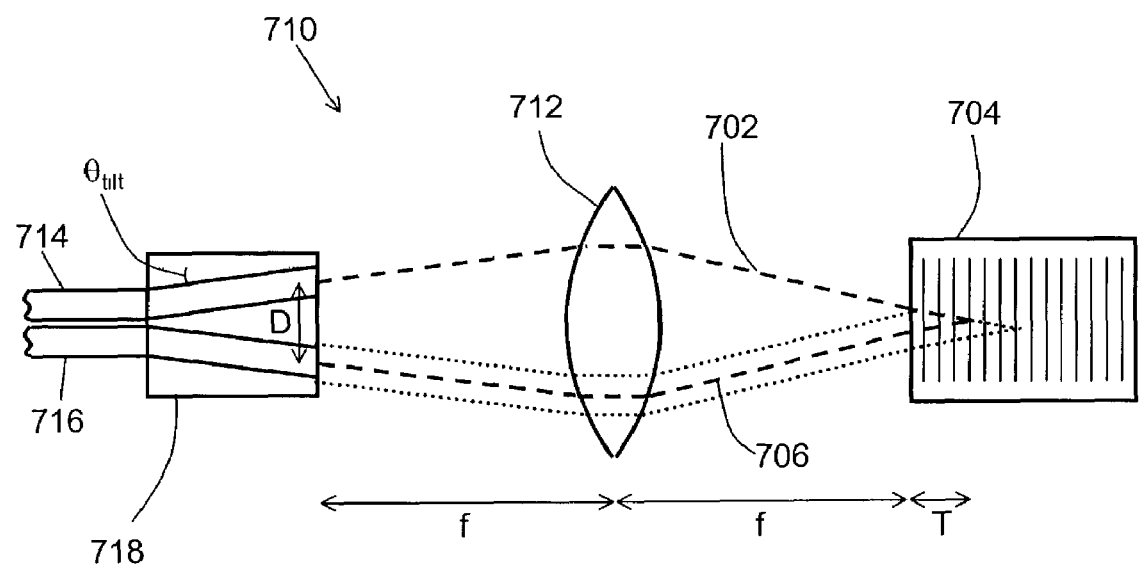
FIG. 7 is a schematic view of a dual-fiber collimator suitable for use in the present invention.

As the skilled artisan will appreciate, the add-drop multiplexer of the present invention may be constructed using two-port collimators in place of the circulator-single collimator architectures described above. In contrast with thin-film interference filters, the reflectance of the Bragg grating filters of the present invention is distributed through the thickness of the filter. For example, as shown in FIG. 7, input beam 702 is incident upon Bragg grating filter 704 at a nonzero angle. Input beam is reflected over a substantial thickness of Bragg grating filter 704. The distributed reflectance serves to laterally shift the center of the reflected beam 706 from the point of incidence of the input beam 702, as well as anamorphically expand the size of the beam along the axis of the shift. In order to account for these effects, the dual fiber collimator shown in FIG. 7 may be used in conjunction with the Bragg grating filters of the present invention. The collimator 710 of FIG. 8 includes a collimating lens 712, an input fiber 714, and an output fiber 716. The fibers are held in a ferrule 718. The ends of the fibers are tilted at an angle $\theta_{tilt}$ to the axis of the collimating lens, and are symmetrically disposed around the axis of the collimating lens. The collimating lens 712 is positioned approximately a focal length away from the end of the input fiber and approximately a focal length from the surface of the filter 704. The tilt angle of the optical fibers may be approximated using the equation $$\theta_{tilt} \approx \frac{T \tan\left(n \cdot \arctan\left(\frac{D}{2f}\right)\right)}{f}$$

where n is the average refractive index of the substrate material of the Bragg grating filter, T is the thickness of the Bragg grating filter at which half of the intensity of the input beam has been reflected, f is the focal length of the collimating lens, and D is the separation of the input and output optical fibers in the collimator. The skilled artisan may further optimize the tilt angle by using beam propagation techniques to maximize the overlap integral of the mode field of the output optical fiber and the field intensity of the focused beam at the end of the output optical fiber. In order to maximize the coupling of the reflected beam into the output optical fiber, it may be desirable to move the end of the output optical fiber somewhat away from the back surface of the collimating lens.

For some applications, better performance of the collimator may be achieved by using a waveguiding structure in place of the ferrule-held fibers described above. For example, the ends of the input and output fibers may be coupled to a planar waveguide configured with their ends having a proper tilt angle and separation. Waveguides with two dimensional guidance can be coupled to the fibers and formed to be close together near the focal plane of the collimating lens. This allows great flexibility with respect to the range of beam sizes and angles of incidence which can be achieved. For example, the small spacing possible between the ends of the input and output waveguides allows for small beam sizes and a small angle of incidence. Weak guiding or no guiding in one dimension (for example, by using a slab waveguide), or a tapered 'horn-like' structure can be used to introduce anamorphic expansion of the beam. The combination of waveguide separation control and anamorphic expansion provides considerable flexibility for matching the output waveguide mode shape with the reflected beam. Additionally, the waveguide surface can be polished to provide tilt to the wavefronts.

Figure 8:
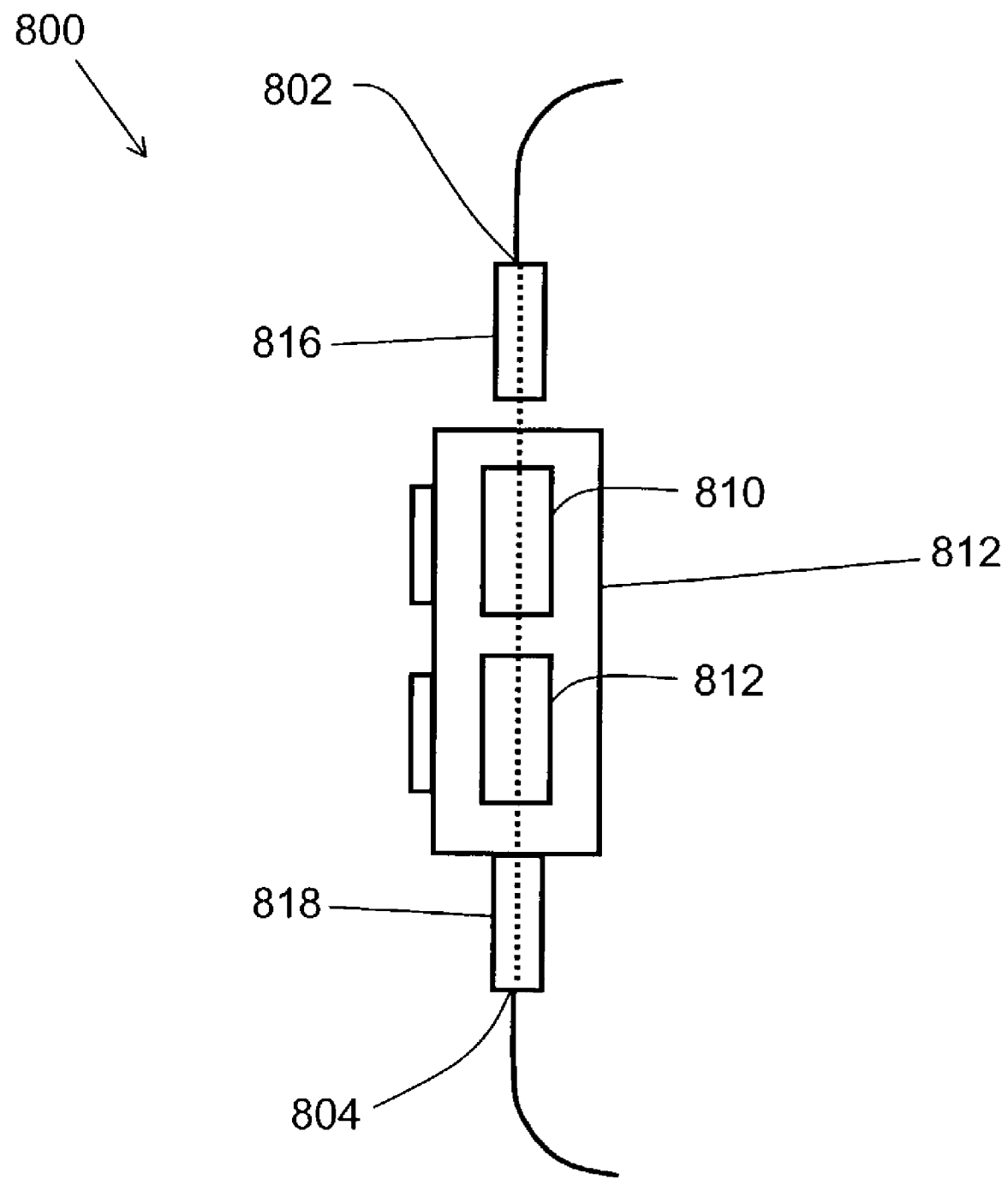
FIG. 8 is schematic view of a of a thermally tuned optical filter array in accordance with an exemplary embodiment of the present invention.

Another exemplary embodiment of the present invention is shown in FIG. 8. In this embodiment of the invention, the device 800 includes an input port 802, an output port 804, and a monolithic filter array including a first filter element 810 and a second filter element 812 arranged in series in the optical path defined by the input port and the output port. Each filter element is adapted to be selectively tunable independent from the other filter element. Illustratively, the filter elements have different tuning ranges. The combined tuning range of the two filter elements is selected to just exceed the wavelength band of interest. In use, one of the filter elements is tuned to reflect the desired channel wavelength, while the other filter element is tuned to be transmissive for all channels (for example, by tuning the filter element to a wavelength between channels, or by tuning the filter element out of the wavelength band of interest.) Filter elements constructed from polymeric materials may be adapted to have wide tuning ranges (e.g. 30-40 nm), and are therefore suitable for use in this embodiment of the invention.

Figure 9:
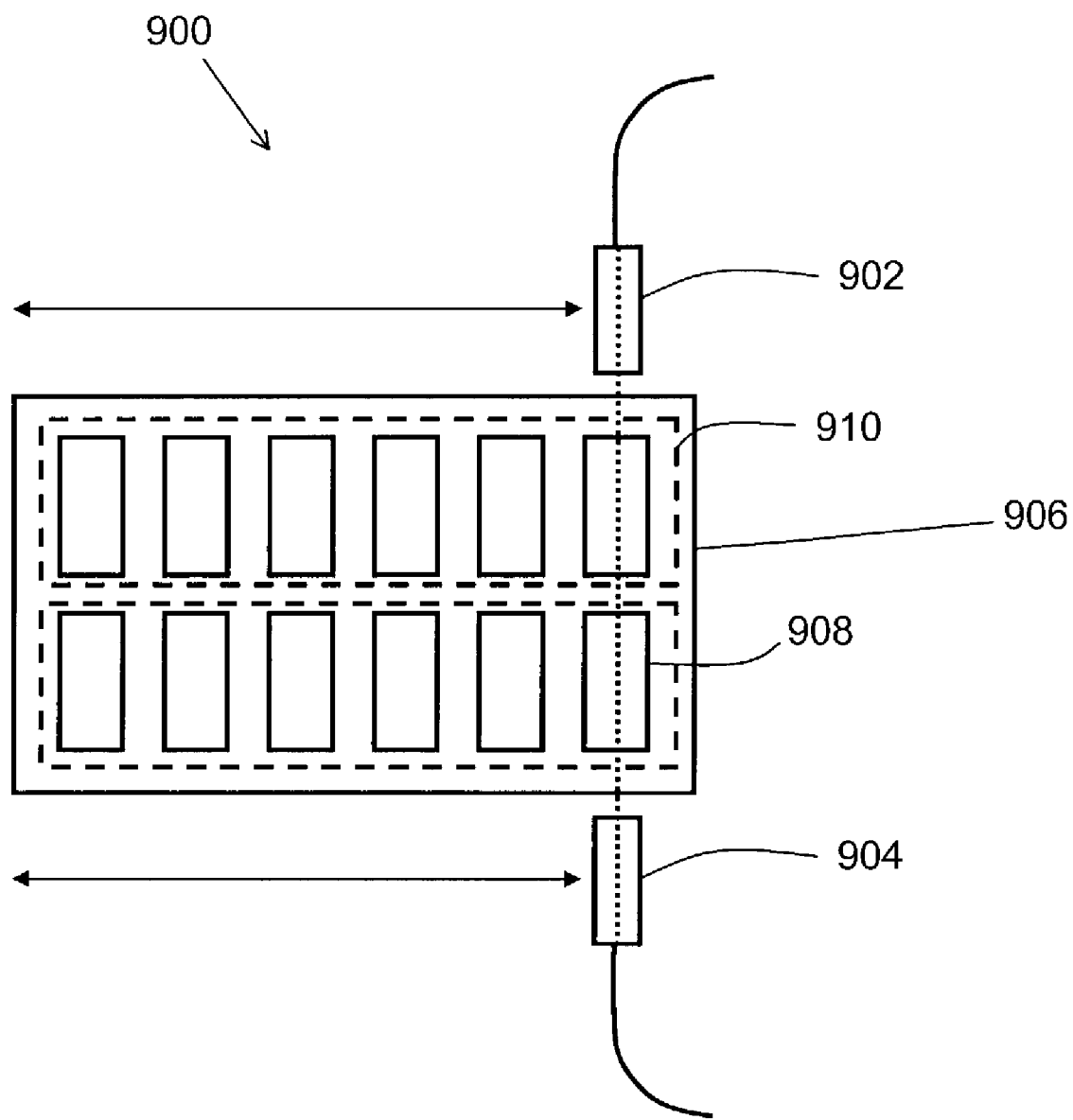
FIG. 9 is a schematic view of a thermally tuned M×2 optical filter array in accordance with an exemplary embodiment of the present invention.

Another exemplary embodiment of the present invention is shown in FIG. 9. In this embodiment of the invention, the monolithic filter array 906 includes an M×2 array of filter elements 908. The combined tuning ranges of the filter elements are chosen to cover the wavelength band of interest. Each column of filter elements is coupled to a thermal tuning device 910. As described above, motion of the filter array relative to the collimators 902 and 904 is used to select a row of the array. The tuning technique described with reference to FIG. 9 is used to select a channel from the tuning range of the filter elements in the selected row. As there may be tens of filter elements in the device of FIG. 9, an high range of tunability for each filter element is not necessary; for example, each filter element may be tunable through a range of just over one channel spacing, as described above.

It is noted that in addition to the reflective and transmissive filters referenced in conjunction with the exemplary embodiments described above, the filter elements may be tunable micro-electromechanical (MEMS) based filters. Moreover, it is noted that in the illustrative embodiments described thus far, the optical filter arrays are comprised of filter elements based upon the same technology. It is noted that this is not necessarily the case, as a variety of such elements based on more than one of the referenced technologies may be incorporated into the same substrate to form an optical filter array.

The invention having been described in detail in connection through a discussion of exemplary embodiments, it is clear that modifications of the invention will be apparent to one having ordinary skill in the art having had the benefit of the present disclosure. Such modifications and variations are included in the scope of the appended claims.

We claim:

1. An optical apparatus comprising:
   a monolithic optical filter array including a plurality of optical filter elements formed monolithically in a common substrate, said monolithic optical filter array formed of a germanosilicate glass comprising approximately 40 mole % to approximately 80 mole % $SiO_2$, approximately 2 mole % to approximately 15 mole % $GeO_2$, approximately 10 mole % to approximately 36 mole % $B_2O_3$, approximately 1 mole % to approximately 6 mole % $Al_2O_3$, and approximately 2 mole % to approximately 10 mole % $R_2O$, wherein R is an alkali; and at least a thermal element disposed proximate the optical filter elements to thermally change a property of at least one of the optical filter elements, thereby changing a resonant wavelength of the at least one of the optical filter elements.

2. An optical apparatus comprising:

a monolithic optical filter array including a plurality of optical filter elements formed monolithically in a common substrate, said monolithic optical filter array formed of a melted photosensitive glass, said optical filter elements arranged in said substrate such that each of said optical filter elements can independently receive an input optical signal incident on an input end of the monolithic optical filter array, wherein said photosensitive glass includes a germanosilicate glass comprising approximately 25 weight % to approximately 45 weight % $SiO_2$, approximately 3 weight % to approximately 22 weight % $GeO_2$, approximately 7 weight % to approximately 28 weight % $B_2O_3$, approximately 6 weight % to approximately 22 weight % $Al_2O_3$, approximately 6 weight % to approximately 25 weight % $R_2O$ wherein R is an alkali, and approximately 3-11 weight % F; and at least a thermal element disposed proximate the optical filter elements to thermally change a property of at least one of the optical filter elements, thereby changing a resonant wavelength of the at least one of the optical elements.

* * * * *